(12) United States Patent
Gevorkov et al.

(10) Patent No.: US 9,137,817 B2
(45) Date of Patent: Sep. 15, 2015

(54) DEVICE, SYSTEM AND METHOD OF SCHEDULING COMMUNICATIONS BY MULTIPLE MEDIUM-ACCESS-CONTROL (MAC) MODULES

(75) Inventors: Alla Galla Gevorkov, Pardes Hannah (IL); Oleg Yusimov, Haifa (IL); Ariel Chen, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 182 days.

(21) Appl. No.: 13/526,628

(22) Filed: Jun. 19, 2012

(65) Prior Publication Data

US 2013/0258921 A1 Oct. 3, 2013

Related U.S. Application Data

(60) Provisional application No. 61/619,492, filed on Apr. 3, 2012.

(51) Int. Cl.
*H04W 72/04* (2009.01)
*H04W 52/02* (2009.01)
*H04W 72/12* (2009.01)
*G08C 17/00* (2006.01)
*H04W 4/00* (2009.01)

(52) U.S. Cl.
CPC ...... *H04W 72/1242* (2013.01); *H04W 52/0216* (2013.01)

(58) Field of Classification Search
CPC ..... H04W 48/16; H04W 88/06; H04W 88/08; H04W 72/04; H04W 72/12; H04L 1/0027; H04L 1/1854; H04L 5/1469; H04L 5/0058

USPC ......... 370/311, 227, 252, 329, 338, 476, 280, 370/312, 336
See application file for complete search history.

(56) References Cited

U.S. PATENT DOCUMENTS

| 8,175,048 B2* | 5/2012 | Akiyama | 370/329 |
| 2006/0023684 A1* | 2/2006 | Seo et al. | 370/338 |
| 2006/0187864 A1* | 8/2006 | Wang et al. | 370/311 |
| 2006/0268931 A1* | 11/2006 | Sella | 370/468 |

(Continued)

OTHER PUBLICATIONS

IEEE Standard for Information technology—Telecommunications and information exchange between systems—Local and metropolitan area networks—Specific requirements. Part 11: Wireless LAN Medium Access Control (MAC) and Physical Layer (PHY) Specifications—Jun. 2007.

(Continued)

*Primary Examiner* — Charles C Jiang
*Assistant Examiner* — Will Lin
(74) *Attorney, Agent, or Firm* — Shichrur & Co.

(57) ABSTRACT

Some demonstrative embodiments relate to scheduling communications by multiple medium-access-control (MAC) modules. For example, a wireless communication unit may be configured to receive binding information from a host, the binding information defining a plurality of bindings between a plurality of MACs and a plurality of different Physical layer (PHY) communication channels sharing a common PHY module, wherein a binding of the bindings binds between a PHY channel of the PHY channels and one or more MACs of the plurality of MACs, and wherein, based on the binding information, the wireless communication unit is to schedule communication of the plurality of MACs over the plurality of PHY channels.

27 Claims, 7 Drawing Sheets

(56) References Cited

U.S. PATENT DOCUMENTS

| | | | |
|---|---|---|---|
| 2010/0142468 A1* | 6/2010 | Cheong et al. | 370/329 |
| 2010/0329166 A1* | 12/2010 | Mahany et al. | 370/311 |
| 2011/0090844 A1* | 4/2011 | Gong et al. | 370/328 |
| 2011/0211564 A1* | 9/2011 | Yoneyama et al. | 370/338 |
| 2011/0314163 A1* | 12/2011 | Borins et al. | 709/227 |
| 2012/0044821 A1* | 2/2012 | Kim et al. | 370/252 |
| 2012/0275471 A1* | 11/2012 | Raju et al. | 370/476 |

OTHER PUBLICATIONS

Wireless-Gigabit-Alliance (WGA) specifications (Wireless Gigabit Alliance, Inc WiGig MAC and PHY Specification Version 1.0, Final specification), Apr. 2010.

\* cited by examiner

DEVICE, SYSTEM AND METHOD OF SCHEDULING COMMUNICATIONS BY MULTIPLE MEDIUM-ACCESS-CONTROL (MAC) MODULES

CROSS REFERENCE

This application claims the benefit of and priority from U.S. Provisional Patent application No. 61/619,492, entitled "Device, System and Method of Scheduling Communications by Multiple Medium-Accesss-Control (MAC) Modules", filed Apr. 3, 2012, the entire disclosure of which is incorporated herein by reference.

BACKGROUND

A wireless communication device may include a plurality of Media-Access-Control (MAC) modules, e.g., implemented by one or more physical and/or virtual MACs.

In some implementations, the plurality of MACs may include two or more MACs configured to communicate over a common wireless communication frequency channel.

In some implementations, the two or more MACs may share a common Physical layer (PHY) channel. For example, a plurality of time slots, e.g., each time slot having a predefined constant duration, may be assigned to the two or more MACs.

Each MAC may be assigned, for example, with one or more dedicated time slots, during which the MAC may communicate via the shared PHY channel.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Wireless Metropolitan Area Network (WMAN) communication system, a Personal Area Network (PAN), a Wireless PAN (WPAN), devices and/or networks operating in accordance with existing IEEE 802.11 standards ("the 802.11 standards"), e.g., including IEEE 802.11 (*IEEE 802.11-2007: Standard for Information technology—Telecommunications and information exchange between systems—Local and metropolitan area networks—Specific requirements, Part 11: Wireless LAN Medium Access Control (MAC) and Physical Layer (PHY) Specifications—June* 2007), 802.11n ("*IEEE 802.11n-2009—Amendment 5: Enhancements for Higher Throughput. IEEE-SA.* 29 October 2009"), 802.11ac ("*Very High Throughput<6 Ghz*"), 802.11 task group ad (TGad) ("*Very High Throughput 60 GHz*"), and/or future versions and/or derivatives thereof, devices, and/or networks operating in accordance with IEEE 802.16 standards ("the 802.16 standards"), e.g., including 802.16 (*IEEE-Std 802.16, 2004 Edition, Air Interface for Fixed Broadband Wireless Access Systems*), 802.16d, 802.16e (*IEEE-Std 802.16e, 2005 Edition, Physical and Medium Access Control Layers for Combined Fixed and Mobile Operation in Licensed Bands*), 802.16f, 802.16m standards and/or future versions and/or derivatives thereof, devices, and/or networks operating in accordance with existing Wireless-Gigabit-Alliance (WGA) and/or WirelessHD™ specifications and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Global Navigation Satellite System (GNSS) device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, Bluetooth (BT) device, a Near Field Communication (NFC) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Global Navigation Satellite System (GNSS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), Bluetooth (BT), Near Field Communication (NFC), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may be used to provide a wireless service.

The term "communicating" as used herein with respect to information includes transmitting the information and/or receiving the information. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. Information may be communicated, for example, between first and second modules by transferring the information from the first module to the second module and/or by transferring the information from the second module to the first module.

Figure 1:
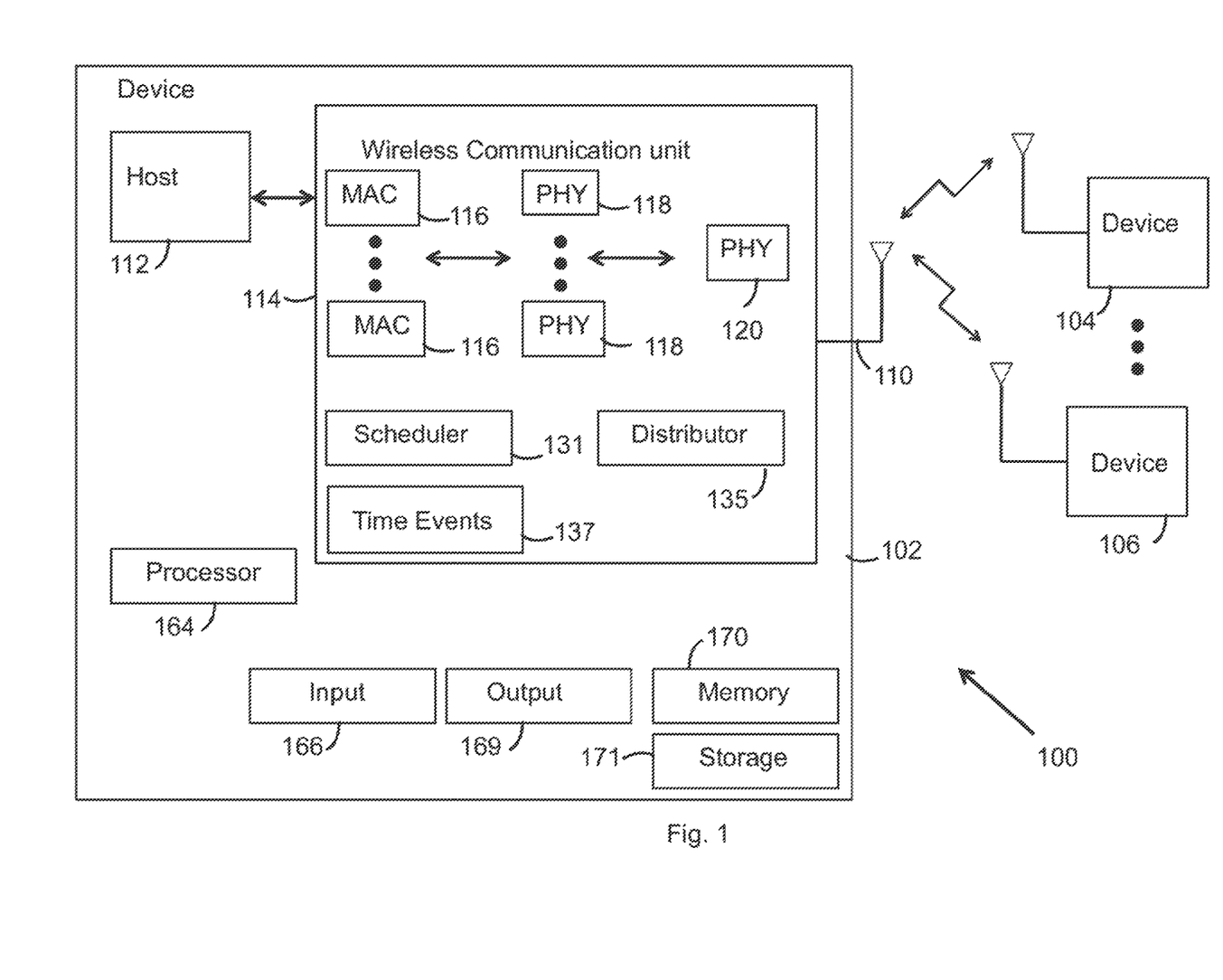
FIG. 1 is a schematic block diagram illustration of a system, in accordance with some demonstrative embodiments.

Reference is now made to FIG. 1, which schematically illustrates a block diagram of a wireless communication system 100, in accordance with some demonstrative embodiments.

In some demonstrative embodiments, system 100 may include at least one wireless communication device 102 capable of communicating with one or more other wireless communication devices, e.g., including devices 104 and/or 106 over a wireless communication medium, e.g., via one or more antennas 110.

In some demonstrative embodiments, the wireless medium may include for example, a Radio Frequency (RF) channel, a WiFi channel, a Bluetooth channel, a cellular channel, and the like.

In some demonstrative embodiments, antennas 110 may include any type of antennas suitable for transmitting and/or receiving wireless communication signals, blocks, frames, transmission streams, packets, messages and/or data. Types of antennas that may be used for antennas 110 may include but are not limited to internal antenna, dipole antenna, omni-directional antenna, a monopole antenna, an end fed antenna, a circularly polarized antenna, a micro-strip antenna, a diversity antenna, a phase array antenna and the like. In some embodiments, antennas 110 may implement transmit and receive functionalities using separate transmit and receive antenna elements. In some embodiments, antennas 110 may implement transmit and receive functionalities using common and/or integrated transmit/receive elements.

In some demonstrative embodiments, device 102 may include a wireless communication unit 114 associated with a host module ("host") 112, e.g., a host driver, to communicate information between host 112 and the one or more other devices, e.g., devices 104 and/or 106. For example, host 112 may include a host driver implemented by an operating system (OS) of device 102 and/or any other application executed by device 102.

In some demonstrative embodiments, wireless communication unit 114 may be configured to enable a plurality of Medium-Access-Controllers (MACs) 116 to communicate over a plurality of different Physical layer (PHY) communication channels 118 via a common PHY module 120. For example, MACs 116 may include one or more virtual MACs, and/or PHYs 118 may include one or more virtual PHYs. PHY module 120 may include, for example, a RF PHY and a base-band (BB) PHY.

In some demonstrative embodiments, wireless communication unit 114 may include, or may be implemented as part of, a Network Interface Card (NIC) including PHY 120.

In some demonstrative embodiments, wireless communication unit 114 may be configured to enable the plurality of MACs 116 to communicate over the plurality of different PHY channels 118 via common PHY 120. In one example, PHY 120 may include a single common PHY 120. In another example, wireless communication unit 114 may include two or more PHY modules 120, each shared by a plurality of PHY channels 118.

In some demonstrative embodiments, at least first and second MACs 116 may share a common PHY channel 118. The first MAC 116 may communicate over the shared PHY channel 118, and may be required to leave the shared PHY channel, for example, when the second MAC 116 is to communicate over the channel, e.g., to search for available networks.

In some demonstrative embodiments, two or more of MACs 116 may utilize two or more different PHY channels 118. For example, a first set of one or more MACs 116 may utilize a first PHY channel 118, and a second set of one or more other MACs 116 may utilize a second PHY channel 118, different from the first PHY channel 118.

In some demonstrative embodiments, an event conflict may occur between MACs 116 residing on different PHY channels 118, for example, if two MACs are required to transmit on two different PHY channels 118, via common PHY 120, e.g., during at least partially overlapping time periods. In another example, an event conflict may occur between the MACs 116 residing on different PHY channels 118, for example, if one MACs requires to transmit on a PHY channel 118, via common PHY 120, e.g., during a time period at least partially overlapping a time period, during which another MAC 116 is required to be absent from another PHY channel 118 sharing common PHY 120.

In some demonstrative embodiments, plurality of bindings may be defined, e.g., by host 112, to identify an association between MACs 116 and PHY channels 118, e.g., as described below.

In some demonstrative embodiments, wireless communication unit 114 may receive binding information from host 112. The binding information may define a plurality of bindings between MACs 116 and PHY communication channels 118 sharing common PHY module 120, e.g., as described below.

In some demonstrative embodiments, MAC 116 and PHY 118 layers may be separated, e.g., in a way that prevents any direct dependency between them.

In some demonstrative embodiments, a binding may bind between a PHY channel 118 and one or more MACs 116, e.g., all MACs 116 residing over the PHY channel 118.

In some demonstrative embodiments, wireless communication unit 114 may include a binding scheduler ("scheduler") 133 configured to schedule communication of MACs 116 over PHY channels 118 based on the binding information, e.g., as described in detail below.

In some demonstrative embodiments, binding scheduler 133 may schedule the communication of MACs 116 over PHY channels 118 during a plurality of binding sessions ("sessions"). Each session may be assigned to a particular binding corresponding to a particular PHY channel 118 for communication of the MACs 116 of the particular binding.

In some demonstrative embodiments, binding scheduler 133 may assign a session identifier (ID), e.g., a unique identifier, to the session. Binding scheduler 133 may append the session ID, for example, to each frame ("Rx frame") received by wireless communication unit 114 during the session and/or to a notification ("host notification") provided to host 112 during the session. Binding scheduler 133 may provide the session ID to host 112, e.g., to enable host 112 to monitor and/or ensure transmission of frames ("Tx frames") on the proper PHY channel 118.

In some demonstrative embodiments, scheduler 133 may assign to the binding session a session duration, which is based on a predefined time unit (TU). In one example, the TU may have a duration of 1024 milliseconds (msec). For example, the binding session may have a duration of at least a predefined number of TUs, for example, at least 4 TUs, e.g., at least 4096 msec.

In some demonstrative embodiments, binding scheduler 133 may schedule communication of the one or more MACs 116 of the particular binding during the session, e.g., as described in detail below.

In some demonstrative embodiments, binding scheduler 133 may switch between first and second sessions by performing a binding context switch.

In some demonstrative embodiments, the binding context switch may include deactivating a first binding ("the deactivated binding") corresponding to a first PHY channel 118 and providing a second binding ("the activated binding") corresponding to a second PHY channel 118 with access to the medium via shared PHY 120. For example, binding scheduler 133 may switch from the session scheduled to the first binding to another session scheduled for the second binding.

In some demonstrative embodiments, wireless communication unit 114 may switch the one or more MACs of the deactivated binding to a power-save mode, e.g., upon switching from the first session to the second session. For example, wireless communication unit 114 may switch the MACs of the deactivated binding to a power saving mode, and may inform one or more peer stations associated with the MACs of the deactivated binding, e.g., Access Points (APs) ad/or clients, of the switch to the power saving mode.

In some demonstrative embodiments, wireless communication unit 114 switch MACs of the activated binding from the power saving mode to an active power mode, and may inform one or more peer stations associated with the MACs of the activated binding, e.g., APs ad/or clients, of the switch to the active power mode.

In some demonstrative embodiments, wireless communication unit 114 may include a distributor ("time dispatcher") 135 to distribute time resources between the MACs of a binding within a session scheduled for the binding, e.g., as described in detail below.

In some demonstrative embodiments, wireless communication unit 114 may receive event information from host 112. The event information may include information defining one or more required communication periods corresponding to MACs 116.

In some demonstrative embodiments, the required communication periods corresponding to a particular MAC 116 may include time periods, during which the particular MAC 116 is required to fulfill and/or satisfy one or more conditions, constraints, restrictions, limitations, and/or requirements with respect to communicating or not communicating over a PHY channel 118.

For example, the event information may include information indicating a communication standard, protocol and the like, to which a MAC is to comply. In one example, the event information may include, e.g., for each MAC 116, an indication of a communication standard, protocol and the like, to which a MAC is to comply, and wireless communication unit 114 may define the required communication time periods for the MAC in compliance with the indicated standard or protocol. For example, the communication standard and/or protocol may define one or more time periods, during which a MAC is required to fulfill and/or satisfy one or more conditions, constraints, restrictions, limitations, and/or requirements, and wireless communication unit 114 may define the required communication time periods for the MAC in compliance with the conditions, constraints, restrictions, limitations, and/or requirements.

In one example, at least one particular binding may bind at least first and second MACs 116 to a particular PHY channel 118, and host 112 may provide to wireless communication unit 114 event information including first event information defining one or more first required communication periods corresponding to the first MAC 116, e.g., according to a first communication protocol and/or standard, and second event information defining one or more second required communication periods corresponding to the second MAC 116, e.g., according to a second communication protocol and/or standard, which may be similar to or different from the first communication protocol and/or standard.

In some demonstrative embodiments, host 112 may also assign priorities to MACs 116, e.g., to enable wireless communication unit to prioritize transmissions and/or resolve conflicts between MACs 116, e.g., as described below.

In some demonstrative embodiments, wireless communication unit 114 may schedule the communication of MACs 116 over PHY channels 118, based on the event information, e.g., as described in detail below.

In some demonstrative embodiments, wireless communication unit 114 may be capable of scheduling medium access via common PHY 120 between MACs 116 according to MAC time events ("time events") 137, which may be defined based on the event information received from host 112.

In some demonstrative embodiments, a MAC 116 may create one or more time events 137, e.g., to ensure fulfillment of requirements from the MAC 116, for example, in accordance with the event information from host 112.

The phrase "time event", as used herein, may relate to a time period, during which a MAC 116, which is to communicate over a PHY channel 118, is required to fulfill and/or satisfy one or more conditions, constraints, restrictions, limitations, and/or requirements with respect to communicating or not communicating over the PHY channel 118. For example, the time event may relate to a time period, during which the MAC 116 is required to fulfill and/or satisfy one or more conditions, constraints, restrictions, limitations, and/or requirements, e.g., according to a communication standard, protocol and the like.

In one example, one or more time events 137 corresponding to a particular MAC 116 associated with a particular PHY channel 118 may define one or more time periods, during which the particular MAC 116 is required to have access to the particular PHY channel 118, and/or one or more time periods, during which the particular MAC 116 is required to be absent from the particular PHY channel 118.

In one example, the time event 137 may be defined according to the IEEE 802.11 standards, and the like. For example, a MAC time event 137 may include a beacon interval, a delivery traffic indication message (DTIM) interval, a contention time, a scanning period, an absence period, and the like.

In some demonstrative embodiments, the MAC 116 may assign a time event 137, e.g., each time event 137, with a priority, e.g., in accordance with the priority assigned by host 112, and one or more attributes defining the time event 137. For example, the attributes may include attributes, which may be used for conflict resolution and/or efficient time map creation, e.g., as described below.

For example, the MAC 116 may define the time event 137 by event data including, for example, one or more of a priority, a start time, a duration, an interval and repetition count, a conflict resolving policy, and the like.

In some demonstrative embodiments, distributor 135 may maintain the time events 137 and the event data corresponding to time events 137, for example, in a time event list or array, e.g., sorted by priority, as described below with reference to FIG. 3.

In some demonstrative embodiments, host 112 may also provide to wireless communication unit 114 quota information including quota, e.g., in TUs, to be distributed between the bindings of PHY channels 118. For example, host 112 may provide the quota information as part of, or together with, the binding information.

For example, the quote information may define criteria for distributing free time among bindings, e.g., after all time events are allocated, as described below.

In some demonstrative embodiments, the quota information may be defined by host 112, for example, to ensure a desired, e.g., fair, distribution of communication resources between the MACs of the bindings. For example, the quota information may define for a particular binding a time duration ("quota duration"), e.g., represented by a number of TUs, to be distributed by MACs of the binding. The quota duration may be distributed between the MACs of the binding for communication, e.g., during a time period ("free time period") of a binding session, which is not scheduled with respect to MAC time events 137, as described below. If, for example, a quota corresponding to a binding is exhausted, then medium access may not be scheduled for the binding, e.g., except for media access periods based on time events defined for MACs of the binding.

In some demonstrative embodiments, distributor 135 may maintain the binding quota corresponding to the plurality of bindings, in a quota list or array, e.g., sorted by binding, as described below with reference to FIG. 3.

In some demonstrative embodiments, distributor 135 may define a time distribution map corresponding to a binding session to map the time events of the MACs of the binding during the session, e.g., as described in detail below.

In some demonstrative embodiments, distributor 135 may define the time distribution map of the binding session, for example, upon a context switch for switching to the binding session. Distributor 135 may redefine the time distribution map of the binding session, for example, upon a change and/or modification of one or more attributes affecting the time distribution map. For example, distributor 135 may redefine the time distribution map of the binding session, for example, upon a time event 137 being added to the session, a time event 137 being removed from the session, a time event 137 of the session being modified, a change in the configuration of the binding, e.g., a change in the number and/or identity of the MACs of the session, a PHY reload request, which may correspond to a change in one or more attributes of the PHY channel, e.g., frequency band and the like.

In some demonstrative embodiments, distributor 135 may determine the time distribution map corresponding to the binding, for example, based on event information of the one or more MACs 116 corresponding to the binding.

In some demonstrative embodiments, distributor 135 may determine the time distribution map by mapping the time events 137 of the MACs 116 of the binding to define one or more non-overlapping communication periods assigned to the one or more MACs of the binding, e.g., as described below.

In some demonstrative embodiments, distributor 135 may maintain the time distribution map of the binding session in the form of a session descriptor, which may define one or more actions at a plurality of points of time during the binding session, e.g., as described below. For example, distributor 135 may provide the session descriptor to scheduler 133, e.g., prior to a context switch for switching to the binding session defined by the session descriptor.

Figure 2:
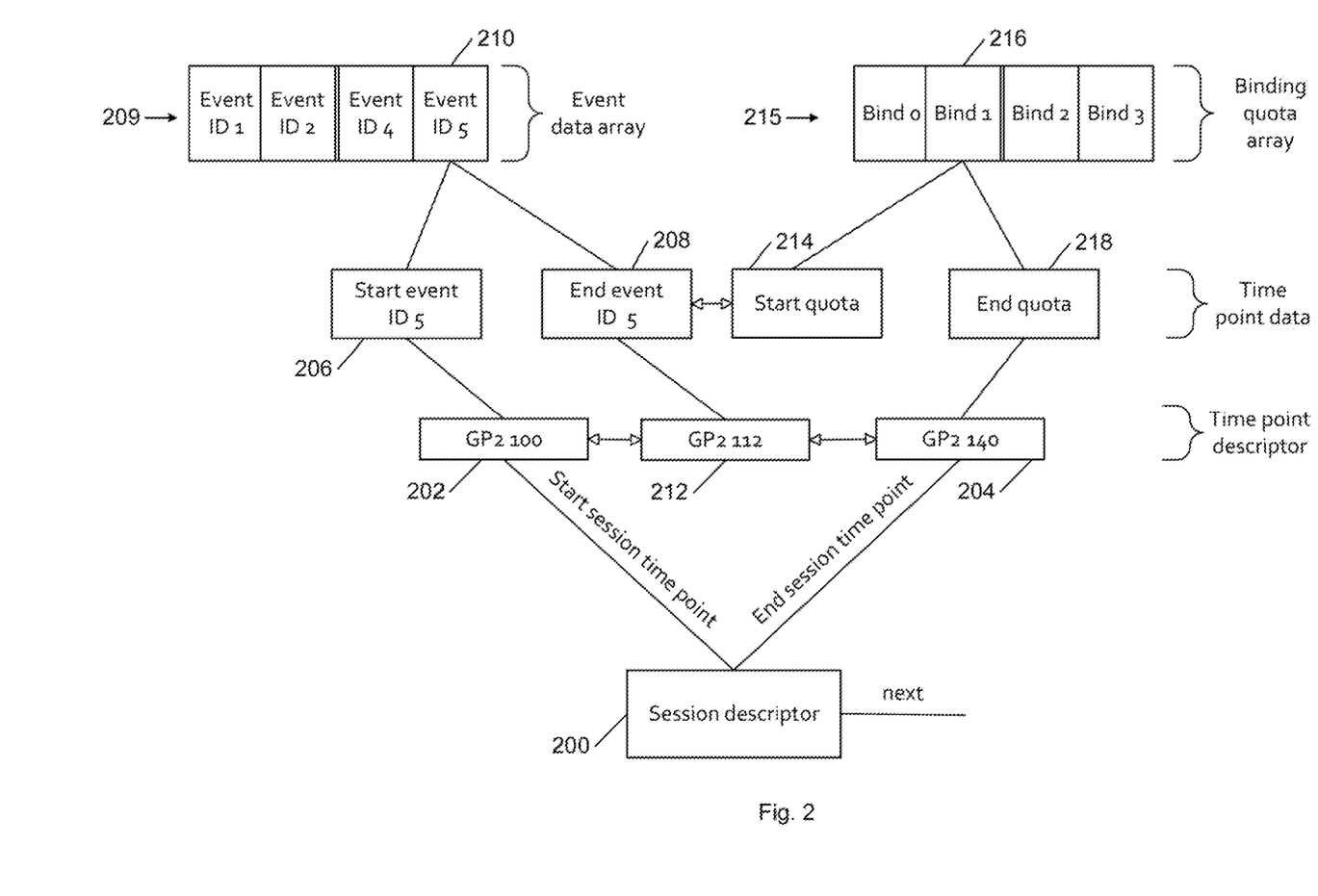
FIG. 2 is a schematic illustration of a session descriptor structure, in accordance with some demonstrative embodiments.

Reference is now made to FIG. 2, which schematically illustrates a structure of a session descriptor 200, in accordance with some demonstrative embodiments.

In some demonstrative embodiments, session descriptor 200 may be defined by a distributor, e.g., distributor 135 (FIG. 1), with respect to a binding session corresponding to a binding, denoted "Bind 1".

In some demonstrative embodiments, session descriptor 200 may include a binding ID to identify the binding. Session descriptor 200 may also include a plurality of time pointers ("descriptors") defining a link list including a sequence of time points corresponding to one or more actions during the session.

For example, session descriptor 200 may include a time pointer defining a time point, e.g., with respect to a reference system timer, of a beginning of the session. For example, as shown in FIG. 2, session descriptor 200 may include a time pointer 202 defining a first time point, e.g., at a system reference clock ("GP2") "100", as a beginning of the session. Session descriptor 200 may also include a time pointer defining a second time point, e.g., with respect to the reference timer, of an end of the session. For example, as shown in FIG. 2, session descriptor 200 may include a time pointer 204 defining a time point, e.g., at the system reference clock "140", e.g., 40 TUs after the first time point, as an end of the session.

In some demonstrative embodiments, session descriptor 200 may also include a plurality of time point data entries indicating actions to be performed, e.g., by scheduler 133 (FIG. 1), with respect to one or more of the time points.

For example, as shown in FIG. 2, session descriptor 200 may include time point data 206 corresponding to descriptor 202. Data 206 may indicate that a time event identified by the event ID "ID 5" is scheduled to begin at the time point of descriptor 202. Session descriptor 200 may include a descriptor 212 defining a third time point, e.g., at the system reference clock "112", e.g., 12 TUs after the first time point, and time point data 208 corresponding to descriptor 212. Data 208 may indicate that the event "ID 5" is to be scheduled to end at the time point of descriptor 212. Descriptor 206 may also identify a time event data entry 210 of the event "ID 5", which may be maintained in a time event data array 209, e.g., as described below with reference to FIG. 3.

In some demonstrative embodiments, scheduler 133 (FIG. 1) may receive from distributor 135 (FIG. 1) the session descriptor 200 including event data 206 and 208 related to the time event "ID 5", and scheduler 133 (FIG. 1) may access the array 209 to retrieve the time event data 210 corresponding to the time event "ID 5".

As also shown in FIG. 2, session descriptor 200 may also include time point data 214 and time point data 218 defining a free time period of the session, which is not scheduled with respect to MAC time events within the session, and may be distributed between MACs of the binding. For example, time point data 214 may indicate that the free time period may begin after the time point of descriptor 212, and time point data 214 may indicate that the free time period may end at the time point of descriptor 204. Time point data 214 may indicate that a quotation be distributed in the free period is to be determined based on quota information 216 corresponding to the binding "Bind 1", as maintained in a binding quota array 215, e.g., as described below with reference to FIG. 3.

In some demonstrative embodiments, scheduler 133 (FIG. 1) may receive from distributor 135 (FIG. 1) the session descriptor 200 including event data 214 and 218 indicating the binding "Bind 1", and scheduler 133 (FIG. 1) may access the array 215 to retrieve the quota data 216 corresponding to the binding "Bind 1".

Figure 3:
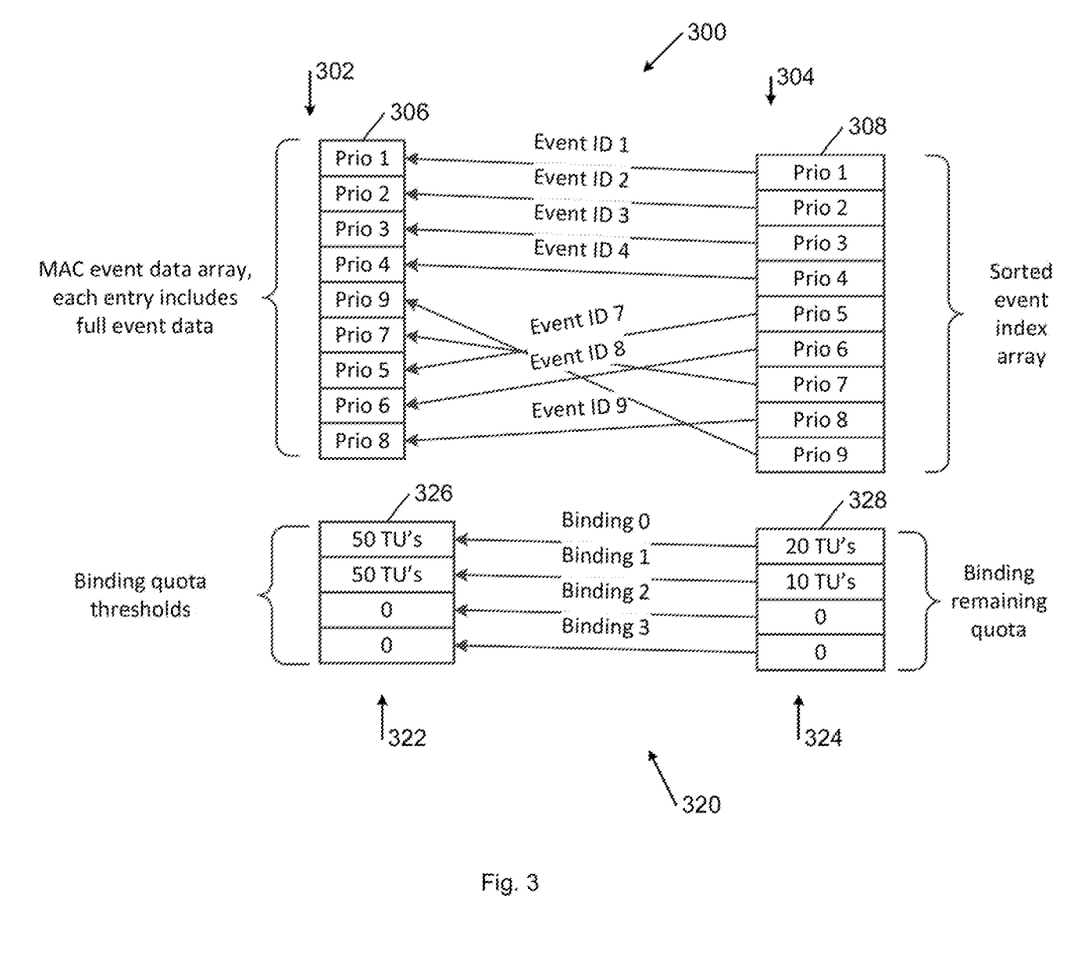
FIG. 3 is a schematic illustration of a time event data structure and a quota data structure, in some demonstrative embodiments.

FIG. 3 is a schematic illustration of a time event data structure 300 associating between time events and priorities, and a quota data structure 320 associating between bindings and binding quota data, in some demonstrative embodiments. For example, data structures 300 and/or 320 may be defined, maintained and/or managed by distributor 135 (FIG. 1).

As shown in FIG. 3, data structure 300 may include an array 302 of event data elements 306 corresponding to a respective plurality of MAC time events 137 (FIG. 1). Array 302 may be sorted, for example, according to event ID. Data structure 300 may also include an array 304 of event IDs 308 of time events 137 (FIG. 1) sorted according to priority. Accordingly, data structure 300 may enable maintaining a list of the time events 137 (FIG. 1) sorted according to priority, e.g., from high to low, for example, by sorting array 304.

In some demonstrative embodiments, distributor 135 (FIG. 1) may sort array 304, e.g., from high priority to low priority, for example, when a time event 302 is added to or removed from structure 300.

As shown in FIG. 3, data structure 302 may include an array 322 of quota thresholds 326 assigned to the plurality of bindings, e.g., as assigned by host 112 (FIG. 1). For example, a first binding, denoted "Binding 0", may have a quota threshold of 50 TUs, a second binding, denoted "Binding 1", may have a quota threshold of 50 TUs, a third binding, denoted "Binding 2", may have a quota threshold of 0 TUs, and a fourth binding, denoted "Binding 3", may have a quota threshold of 0 TUs.

As shown in FIG. 3, data structure 302 may include an array 324 of remaining quotas 328 per binding. For example, as shown in FIG. 3, "Binding 0" may have a remaining quota of 20 TUs, "Binding 1" may have ea remaining quota of 10 TUs, and "Binding 2" and "Binding 3" may each have no remaining quota.

In some demonstrative embodiments, distributor 135 (FIG. 1) may decrease the remaining quota 328 of a particular binding, e.g., when allocating quota to the particular binding.

In some demonstrative embodiments, distributor 135 (FIG. 1) may not change the quota of the particular binding, for example, if the remaining quota of the particular binding is less than or equal to the threshold 326 corresponding to the particular binding, while there are one or more other bindings, which still did not exhaust their quotas.

In some demonstrative embodiments, distributor 135 (FIG. 1) may allocate quota to one or more remaining bindings, e.g., until all of the bindings reach predefined minimum thresholds. For example, distributor 135 (FIG. 1) may allocate quota to the bindings according to a round robin algorithm, or any other algorithm. For example, distributor 135 (FIG. 1) may go through the active bindings and, for each binding schedule quota, e.g., until reaching a minimal quota threshold. Once all bindings reach the minimum quota threshold, remaining quota values may be re-initialized to the values set by host 112 (FIG. 1), and so on.

In some demonstrative embodiments, quotas may be refilled to full quota values, e.g., when all bindings exhausted their quotas and reached the minimal thresholds 326.

Referring back to FIG. 1, in some demonstrative embodiments, distributor 135 may maintain a mapping of time events for a MAC in the form of a combination of a presence indication map and an absence indication map. The presence indication map may indicate time periods, during which the MAC is required to be present on a corresponding PHY channel 118, and the absence indication map may indicate time periods, during which the MAC is required to be absent from the corresponding PHY channel 118.

In some demonstrative embodiments, the presence indication map and/or the absence indication may be maintained in the form of a data structure including a sequence of a predefined number of bits, e.g., as described below with reference to FIG. 4. In other embodiments, the presence indication map and/or the absence indication may be maintained in any other suitable format, code, value, array, and the like.

Figure 4:
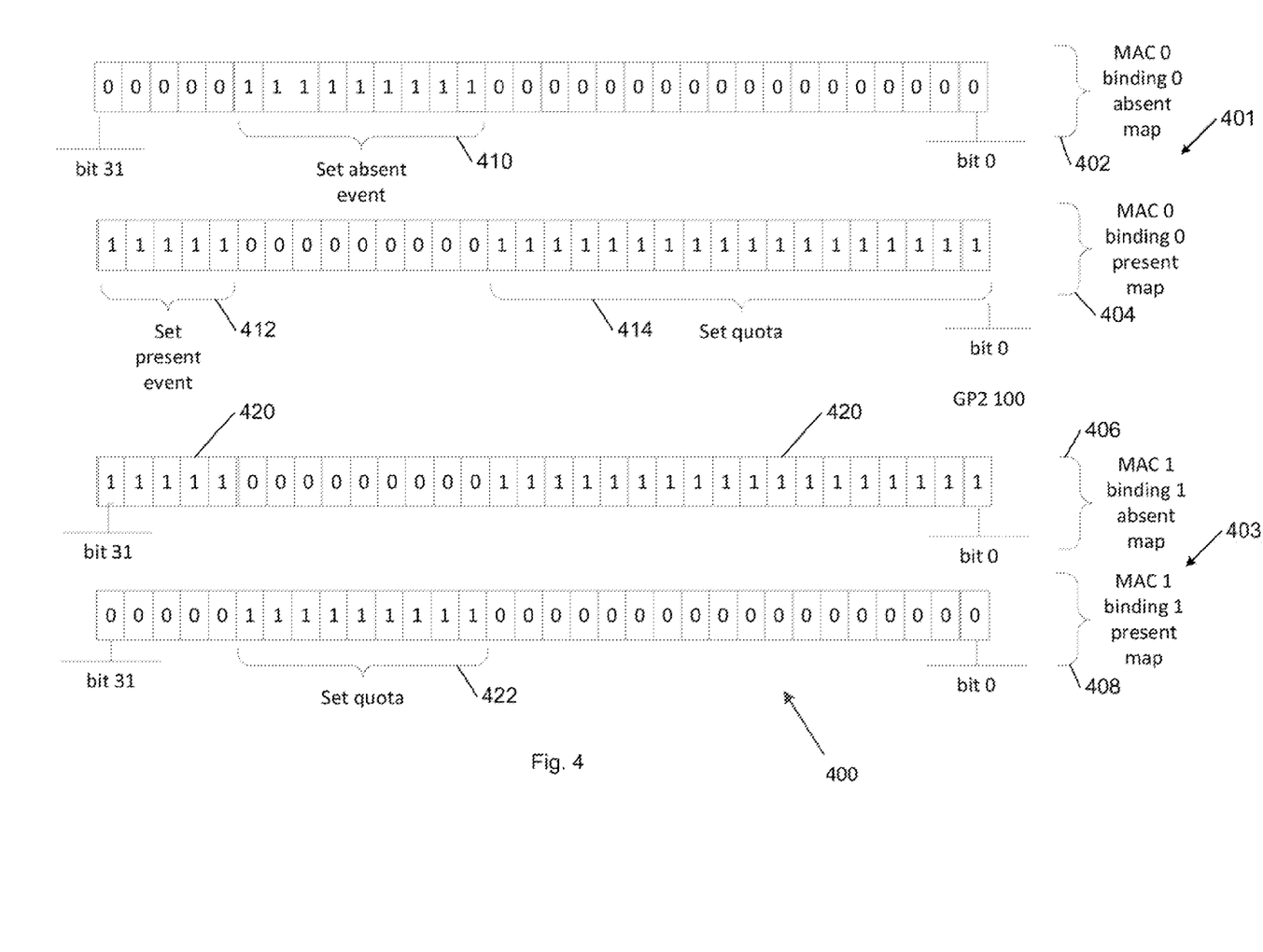
FIG. 4 is a schematic illustration of a mapping data structure maintaining a mapping of time events for Medium-Access-Controllers (MACs) of first and second bindings, in some demonstrative embodiments.

Reference is made to FIG. 4, which schematically illustrates a data structure 400 of maintaining a mapping 401 of time events for a first MAC, denoted "MAC 0" of a first binding, denoted "binding 0", corresponding to a first PHY channel 118 (FIG. 1), and a mapping 403 of time events for a second MAC, denoted "MAC a" of a second binding, denoted "binding 1", corresponding to a first PHY channel 118 (FIG. 1), in some demonstrative embodiments.

In some demonstrative embodiments, distributor 135 (FIG. 1) may define data structure 400 to represent time events 137 (FIG. 1), e.g., based on the event information received from host 112 (FIG. 1).

In some demonstrative embodiments, mapping 401 may include an absence map 402 defining time periods, during which the first MAC is to be absent from the first PHY channel 118 (FIG. 1), and a present map 404 defining time periods, during which the first MAC is to be present on the first PHY channel 118 (FIG. 1).

In some demonstrative embodiments, mapping 403 may include an absence map 406 defining time periods, during which the second MAC is to be absent from the second PHY channel 118 (FIG. 1), and a present map 408 defining time periods, during which the second MAC is to be present on the second PHY channel 118 (FIG. 1).

In some demonstrative embodiments, maps 402, 404, 406 and/or 408 may each include a sequence of a predefined number of bits. For example, each bit may represent a predefined time period, e.g., 4 msec, or any other time period. For example, a shown in FIG. 4 maps 402, 404, 406 and/or 408 may each include 32 bits, denoted bit0 . . . bit31, each representing a time period of 4 msec, e.g., maps 402, 404, 406 and/or 408 may each relate to a total time period of 32*4=128 msec.

In some demonstrative embodiments, distributor 135 (FIG. 1) may set a first value, e.g., "1", to bits of map 402 to indicate a time period 410 during which the first MAC is required to be absent from the first PHY channel 118 (FIG. 1), and may maintain a second value, e.g., "0", for time periods during which the first MAC is not required to be absent from the first PHY channel 118 (FIG. 1).

In some demonstrative embodiments, distributor 135 (FIG. 1) may set a first value, e.g., "1", to bits of map 404 to indicate a time period 412 during which the first MAC is required to be present on the first PHY channel 118 (FIG. 1), and may maintain a second value, e.g., "0", for time periods during which the first MAC is not required to be present on the first PHY channel 118 (FIG. 1).

In some demonstrative embodiments, distributor 135 (FIG. 1) may also set the first value to bits in map 404 corresponding to a time period 414, during which the first MAC is not required to be present on the first PHY channel 118 or to be absent from the first PHY channel 118. For example, quota may be assigned to the first MAC during time period 414.

In some demonstrative embodiments, distributor 135 (FIG. 1) may set the first value to bits of map 406 to indicate time periods 420 during which the second MAC is required to be absent from the second PHY channel 118 (FIG. 1), and may maintain the second value for time periods during which the second MAC is not required to be absent from the second PHY channel 118 (FIG. 1).

In some demonstrative embodiments, there may be no time, during which the second MAC is required to be present on the second PHY channel 118 (FIG. 1).

In some demonstrative embodiments, distributor 135 (FIG. 1) may set the first value to bits in map 408 corresponding to a time period 422, during which the second MAC is not required to be present on the second PHY channel 118 or to be absent from the second PHY channel 118. For example, quota may be assigned to the second MAC during time period 422.

In some demonstrative embodiments, distributor 135 (FIG. 1) may maintain the same common start time map value (system reference timer), e.g., for all binding and MAC maps.

Figure 5:
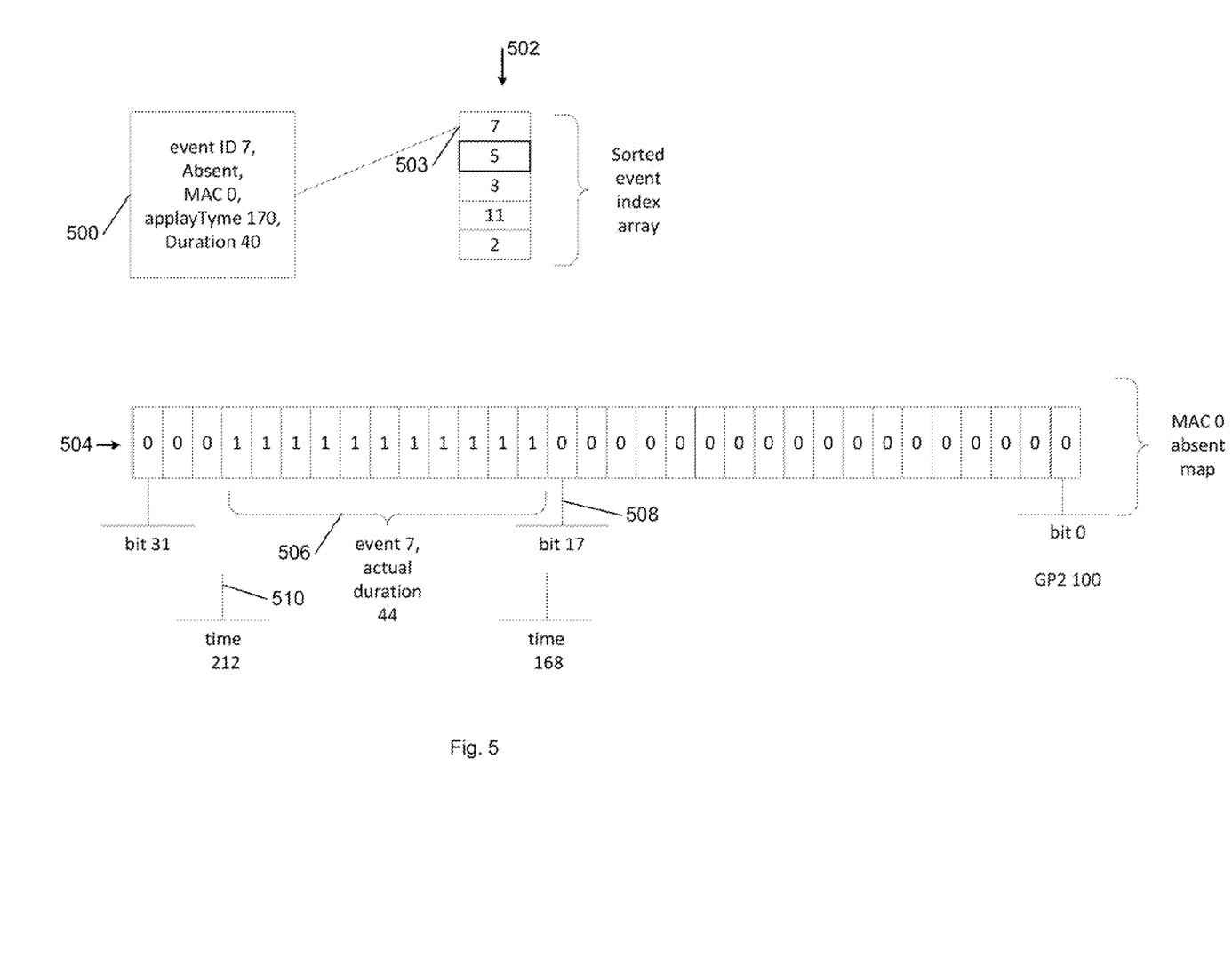
FIG. 5 is a schematic illustration of a data structure of a mapping of a MAC absent event, in accordance with some demonstrative embodiments.

Reference is made to FIG. 5, which schematically illustrates a data structure of a mapping of a MAC absent event, denoted "ID 7", to a map 504, based on event data 500 corresponding to the event "ID 7", in accordance with some demonstrative embodiments.

For example, distributor 135 (FIG. 1) may retrieve from an event array 502 an indicator 503 corresponding to the event "ID 7", e.g., as described above with reference to FIG. 3. Indicator 503 may be associated with event data 500, e.g., based on the data structure described above with reference to FIG. 3.

In some demonstrative embodiments, distributor 135 (FIG. 1) may map event data 500 onto map 504.

For example, event data 500 may define an absence event beginning at a time point of 170 TUs and lasting for a duration of 40 TUs. Accordingly, distributor 135 (FIG. 1) may define map 500 to begin at the reference clock time GP2 of 100 TUs, and may map the absence event to be represented by the time period 506 represented by the eleven bits beginning at the bit 508 (bit18) and ending at the bit 510 (bit28), which correspond to the time period beginning at the time point 168 TUs and lasting for 44 TUs.

Referring back to FIG. 1, in some demonstrative embodiments, distributor 135 may determine the time distribution map to be applied for scheduling the plurality of MAC events 137, for example, based on the presence and absence maps, e.g., maps 402, 404, 406 and/or 408 (FIG. 4), corresponding to the MAC events 137, e.g., as described in detail below.

In some demonstrative embodiments, distributor 135 may define the time distribution map, for example, by running over the time event list of events 137, for example, from the highest priority to the lowest priority, e.g., according to structure 300 (FIG. 3).

In some demonstrative embodiments, for each presence time event 137 ("the time event being mapped") corresponding to a particular MAC distributor 135 may verify whether there is enough time for the full event duration of the time event being mapped, e.g., by checking that there are no conflicts between the presence map of the particular MAC and all other MAC presence indications and the absence map of the particular MAC. For example, MAC distributor 135 may check for conflicts between presence time period 412 (FIG. 4) required for the MAC "MAC 0", and presence map 408 (FIG. 4) of the MAC "MAC 1".

In some demonstrative embodiments, for each absence time event 137 being mapped distributor 135 may check to verify that there is no marked presence indication at the same time as the absence event being mapped. For example, MAC distributor 135 may check for conflicts between absence time period 410 (FIG. 4) required for the MAC "MAC 0", and presence map 408 (FIG. 4) of the MAC "MAC 1".

In some demonstrative embodiments, distributor 135 may mark as "busy" the duration of the absence or presence event 137 being mapped, e.g., if no conflict is detected. For example, distributor 135 may mark the duration as "busy", e.g., by setting corresponding bits of the map to the value "1".

In some demonstrative embodiments, distributor 135 may shift the time event 137 being mapped, for example, by a minimal duration, e.g., corresponding to one bit of the map, for example, if a conflict is detected with respect to the time event 137 being mapped. Distributor 135 may attempt to continue shifting the time event 137 being mapped, for example, until no conflict is detected, e.g., as long as a predefined shifting threshold, denoted MAX_DELAY_TIME, is not reached.

In some demonstrative embodiments, distributor 135 may not be able to map the time event, for example, if no possible location is found after reaching the threshold shifting MAX_DELAY_TIME.

In some demonstrative embodiments, distributor 135 may include the time event 137 being mapped in a session descriptor, e.g., session descriptor 200 (FIG. 2), for example, if distributor 135 is able to successfully map the time event 137. For example, distributor 135 may save in a ink list of the session descriptor a time pointer, e.g., time pointer 202 (FIG. 2), defining a beginning of the time period assigned to the time event 137, ad a time pointer, e.g., time pointer 212 (FIG. 2), defining an end of the time period assigned to the time event 137.

Figure 6:
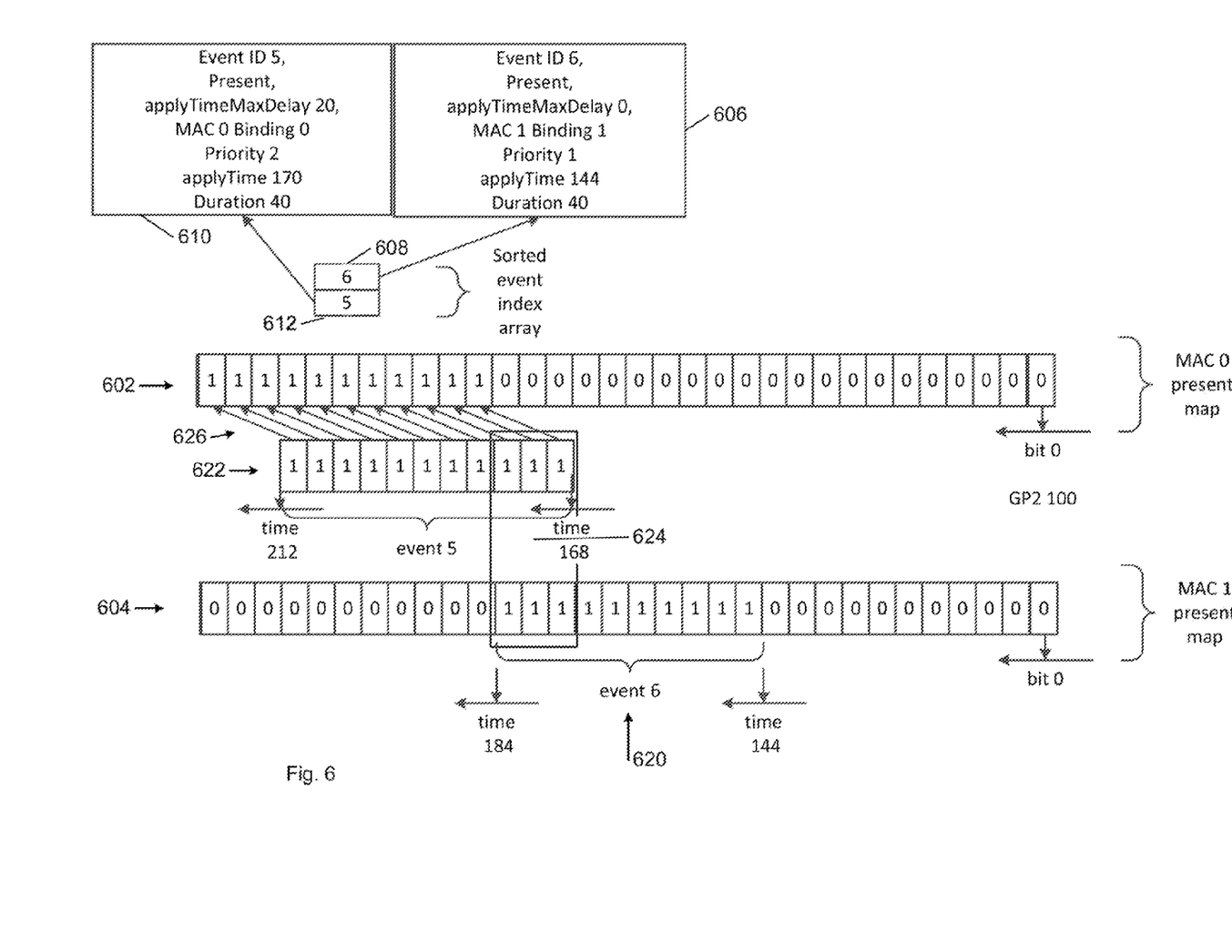
FIG. 6 is a schematic illustration of a scheduling of first and second time events, in accordance with some demonstrative embodiments.

Reference is made to FIG. 6, which schematically illustrates scheduling a first presence time event, denoted "event ID 6", and a second present time event, denoted "event ID 5", in accordance with some demonstrative embodiments.

For example, distributor 135 (FIG. 1) may maintain a priority array, e.g., array 304 (FIG. 3), including an index 608 of the first presence time event, followed by an index 612 of the second presence time event, e.g., since the priority of the first presence time event may be higher than the priority of the second presence time event.

As shown in FIG. 6, distributor 135 (FIG. 1) may maintain an array of event data elements, e.g., array 302 (FIG. 2), including an event data element 606 identified by index 608, and an event data element 610 identified by index 612.

For example, event data element 606 may include event data corresponding to the first presence time event, e.g., indicating a first MAC, e.g., MAC 1, a first binding, e.g., binding 1, a priority, e.g., priority 1, a start time, e.g., "144", and a duration, e.g., 40 TUs.

For example, event data element 610 may include event data corresponding to the second presence time event, e.g., indicating a second MAC, e.g., MAC 0, a second binding, e.g., binding 0, a priority, e.g., priority 2, a start time, e.g., "170", and a duration, e.g., 40 TUs.

As shown in FIG. 6, distributor 135 (FIG. 1) may place the first presence time event on a presence map 604 corresponding to the first MAC, e.g., after verifying that there is no conflict for the first presence time event. For example, distributor 135 (FIG. 1) may place the first presence time event in accordance with the information of event data element 606. For example, distributor 135 (FIG. 1) may place the first presence time event during a period 620 beginning at the time "144" and ending at the time "184".

As shown in FIG. 6, distributor 135 (FIG. 1) may attempt to place the second presence time event on a presence map 602 corresponding to the second MAC, for example, after assigning the duration 620 to the first presence time event, e.g., since the priority of the second presence time event is lower than the priority of the first time event.

As shown in FIG. 6, distributor 135 (FIG. 1) may attempt to place the second presence time event in accordance with the information of event data element 610. For example, distributor 135 (FIG. 1) may attempt to place the second presence time event during a period 622 beginning at the time "168" and ending at the time "212". However, as shown in FIG. 6, a portion 624 of period 622 may be in conflict with the already placed period 620.

A shown in FIG. 6, distributor 135 (FIG. 1) may shift the beginning of the second presence time event, e.g., to a time point, which is not in conflict with period 622. Accordingly, distributor 135 (FIG. 1) may shift the beginning of the second presence time event by placing the second presence time event during a shifted period 626 beginning at time point "184" and ending at time point "228".

Referring back to FIG. 1, in some demonstrative embodiments, when all time events 137 have been placed and/or conflicts resolved, distributor 135 may allocate empty time slots remaining in the session, e.g., according to remaining quota array values, e.g., of array 324 (FIG. 3), and the MAC presence/absence maps.

In some demonstrative embodiments, distributor 135 may refill the quota array 324 with host defined values, which are added to remaining quota values at specific time points, which are equal to a summary of quotas for all bindings. For example if there are binding 0 and binding 1 with quotas 50 TUs and 50 TUs, the time will be added to quota remaining array each 100 TUs.

In some demonstrative embodiments, if the time dispatcher algorithm is triggered before the end of a previously calculated session corresponding to a binding, unused quota may be "returned" to remaining quota array 324 (FIG. 3) of the binding. For example, if a current session belongs to the binding 0, and the current session has a scheduled duration of 100 TU, and 30 TUs after the start of the current session start a change in event configuration was made and triggered recalculation of the session. In such case, only 30 TUs will be removed from the remaining quota for the binding 0, and the 70 unused TUs will be "returned" to the quota of the binding 0.

In some demonstrative embodiments, the time distribution may include creating high priority presence and absence events, which correspond, for example, to events, which require promising the presence of a MAC, e.g., if a point-to-point (P2P) Group Owner (GO) must promise its presence as it was published in its NOA (notice of absence).

In some demonstrative embodiments, device 102 may include, for example, one or more of a processor 164, an input unit 166, an output unit 169, a memory unit 170, and a storage unit 171. Device 102 may optionally include other suitable hardware components and/or software components. In some embodiments, some or all of the components of device 102 may be enclosed in a common housing or packaging, and may be interconnected or operably associated using one or more wired or wireless links. In other embodiments, components of device 102 may be distributed among multiple or separate devices or locations.

Processor 164 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 164 executes instructions, for example, of host 112, an Operating System (OS) of wireless communication device 102 and/or of one or more suitable applications.

Input unit 166 includes, for example, a keyboard, a keypad, a mouse, a touch-pad, a track-ball, a stylus, a microphone, or other suitable pointing device or input device. Output unit 169 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 170 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 171 includes, for example, a hard disk drive, a floppy disk drive, a Compact Disk (CD) drive, a CD-ROM drive, a DVD drive, or other suitable removable or non-removable storage units. Memory unit 170 and/or storage unit 171, for example, may store data processed by wireless communication device 102. For example, memory 170 and/or storage unit 171 may store instructions resulting in host 112 the OS of wireless communication device 102 and/or of one or more suitable applications.

Figure 7:
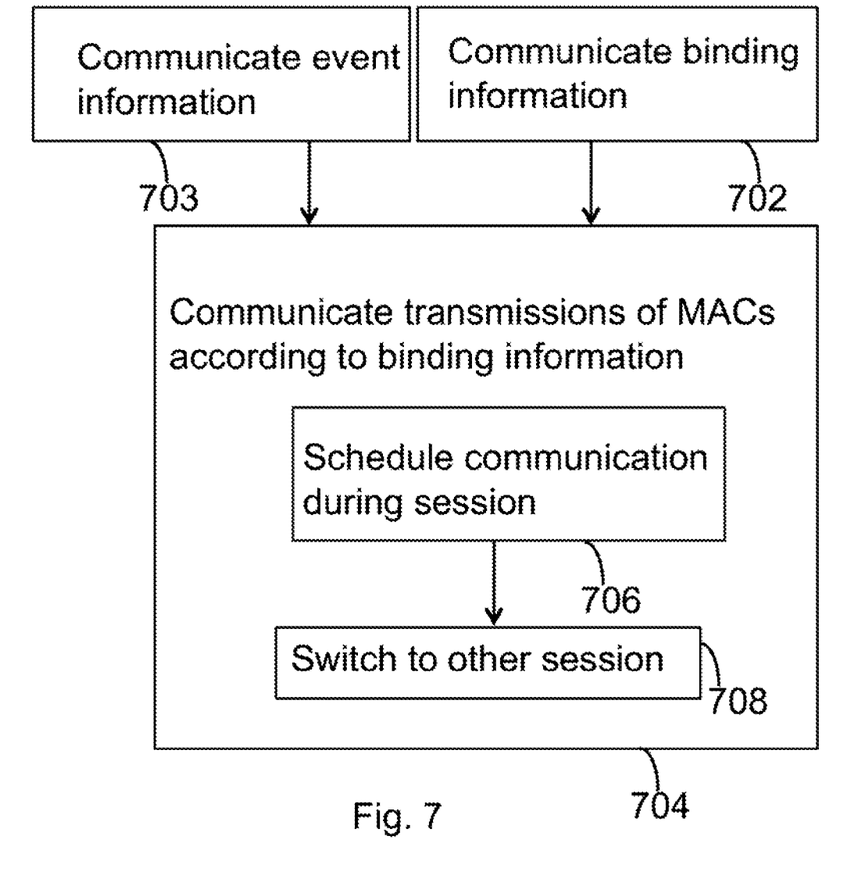
FIG. 7 is a schematic flow chart illustration of a method of scheduling communication by a plurality of MACs, in accordance with some demonstrative embodiments.

Reference is made to FIG. 7, which schematically illustrates a method of scheduling communication by a plurality of MACs, in accordance with some demonstrative embodiments. For example, one or more operations of the method of FIG. 7 may be performed by a system, e.g., system 100 (FIG. 1), a device, e.g., device 102 (FIG. 1), a host, e.g., host 112 (FIG. 1), and/or a wireless communication unit, e.g. wireless communication unit 114 (FIG. 1).

As indicated at block 702, the method may include communicating binding information defining a plurality of bindings between a plurality of MACs and a plurality of different PHY communication channels sharing a common PHY module. For example, host 112 (FIG. 1) may provide to wireless communication unit 114 (FIG. 1) binding information defining bindings between MACs 116 (FIG. 1) and PHY channels 118 (FIG. 1) sharing common PHY 120 (FIG. 1), e.g., as described above.

As indicated at block 704, the method may include communicating transmissions of the plurality of MACs over the plurality of PHY channels, according to a schedule, which is based on the binding information. For example, scheduler 131 (FIG. 1) may schedule transmissions of MACs 116 based on the binding information, e.g., as described above.

As indicated at block 703, the method may include communicating event information defining one or more required communication periods corresponding to the plurality of MACs. For example, host 112 (FIG. 1) may provide to wireless communication unit 114 (FIG. 1) event information defining time events 137 (FIG. 1), e.g., as described above.

The schedule may be determined, for example, based on the event information. For example, distributor 135 (FIG. 1) may map the time events 137 (FIG. 1) to a time distribution map of a session descriptor, and scheduler 131 (FIG. 1) may schedule the transmission of the MACs according to the session descriptor, e.g., as described above.

As indicated at block 706, communicating the transmissions of the MACs may include scheduling communication of one or more MACs of a particular binding during a session. For example, scheduler 131 (FIG. 1) may schedule the transmissions of the MACs 116 of a binding during a session assigned to the binding, e.g., as described above.

As indicated at block 708, communicating the transmissions of the MACs may include switching to another session scheduled for another binding. For example, scheduler 131 (FIG. 1) may switch to a subsequent session assigned to another binding, e.g., as described above. For example, switching to the other session may include switching the one or more MACs of the particular binding to a power-save mode, e.g., as described above.

Figure 8:
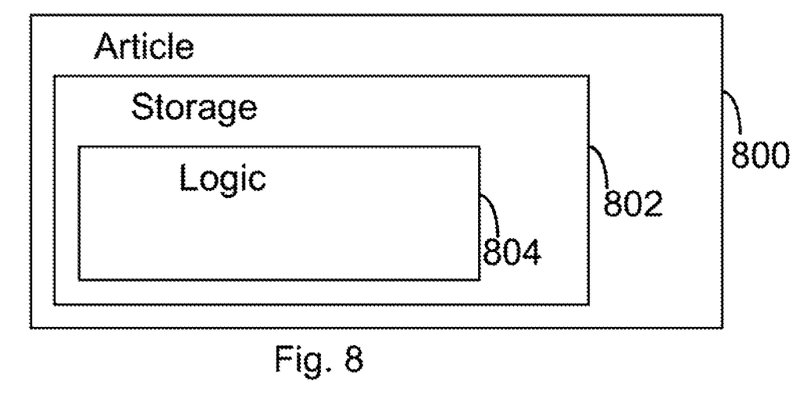
FIG. 8 is a schematic illustration of an article of manufacture, in accordance with some demonstrative embodiments.

Reference is made to FIG. 8, which schematically illustrates an article of manufacture 800, in accordance with some demonstrative embodiments. Article 800 may include a non-transitory machine-readable storage medium 802 to store logic 804, which may be used, for example, to perform at least part of the functionality of host 112 (FIG. 1), wireless communication unit 114 (FIG. 1), scheduler 131 (FIG. 1), distributor 135 (FIG. 1), MACs 116 (FIG. 1) and/or to perform one or more operations of the method of FIG. 7. The phrase "non-transitory machine-readable medium" is directed to include all computer-readable media, with the sole exception being a transitory propagating signal.

In some demonstrative embodiments, article 800 and/or machine-readable storage medium 802 may include one or more types of computer-readable storage media capable of storing data, including volatile memory, non-volatile memory, removable or non-removable memory, erasable or non-erasable memory, writeable or re-writeable memory, and the like. For example, machine-readable storage medium 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A device comprising:
   wireless communication circuitry to schedule communication of a plurality of Medium-Access-Controllers (MACs) via a Physical layer (PHY) module, the PHY module including a Radio-Frequency physical layer and a Baseband physical layer, the wireless communication circuitry to receive binding information from a host, the binding information defining a plurality of bindings between the plurality of MACs and a plurality of different PHY communication channels sharing said PHY module,
   wherein a binding of said bindings binds between a PHY channel of said PHY channels and one or more MACs of said plurality of MACs,
   and wherein, based on said binding information, said wireless communication circuitry is to schedule communication of said plurality of MACs over said plurality of PHY channels.

2. The device of claim 1, wherein said wireless communication circuitry is to receive event information defining one or more required communication periods corresponding to said plurality of MACs, and wherein the wireless communication circuitry is to schedule the communication of said plurality of MACs over said plurality of PHY channels based on said event information.

3. The device of claim 2, wherein at least one particular binding binds at least first and second MACs to a particular PHY channel, said event information including first event information defining one or more first required communication periods corresponding to said first MAC and second event information defining one or more second required communication periods corresponding to said second MAC.

4. The device of claim 3, wherein said binding information includes quota information defining a relative distribution of communication resources between said plurality of bindings, and wherein, based on said quota information, said wireless communication circuitry is to distribute at least one time period, which is not required based on said first and second event information, between said first and second MACs.

5. The device of claim 2, wherein the one or more required communication periods include at least one period selected from the group consisting of a presence period, during which a MAC of said one or more MACs is required to be present on said PHY channel, and an absence period, during which the MAC of said one or more MACs is required to be absent from said PHY channel.

6. The device of claim 2, wherein said event information comprises one or more event parameters corresponding to a required communication period of said one or more required communication periods, the event parameters include at least one parameter selected from the group consisting of a priority of said required communication period, a start time of said required communication period, a duration of said required communication period, an interval of said required communication period, a repetition count of said required communication period, and a conflict resolving policy corresponding to said required communication period.

7. The device of claim 2, wherein said one or more required communication periods include at least one period selected from the group consisting of a beacon interval, a delivery traffic indication message (DTIM) interval, a contention time, a scanning period, and an absence period.

8. The device of claim 1, wherein said wireless communication circuitry is to determine a time distribution map corresponding to said binding, based on event information of said one or more MACs, the time distribution map defining one or more non-overlapping communication periods assigned to said one or more MACs.

9. The device of claim 1, wherein said wireless communication circuitry is to schedule a session for a particular binding, and to schedule communication of the one or more MACs of said particular binding during said session.

10. The device of claim 9, wherein said wireless communication circuitry is to switch to another session scheduled for an other binding, and to switch the one or more MACs of the particular binding to a power-save mode.

11. The device of claim 1, wherein said plurality of MACs include at least one virtual MAC.

12. A method comprising:
    communicating binding information, the binding information defining a plurality of bindings between a plurality of Medium-Access-Controllers (MACs) and a plurality of different Physical layer (PHY) communication channels sharing a common PHY module, the PHY module including a Radio-Frequency physical layer and a Baseband physical layer, wherein a binding of said bindings binds between a PHY channel of said PHY channels and one or more MACs of said plurality of MACs; and
    communicating transmissions of said plurality of MACs over said plurality of PHY channels, according to a schedule, which is based on said binding information.

13. The method of claim 12, wherein communicating said binding information comprises receiving said binding information by a wireless communication unit.

14. The method of claim 12, wherein communicating said binding information comprises providing said binding information from a host to a wireless communication unit.

15. The method of claim 12 comprising communicating event information defining one or more required communication periods corresponding to a MAC of said plurality of MACs, wherein said schedule is based on said event information.

16. The method of claim 15, wherein at least one particular binding binds at least first and second MACs to a particular PHY channel, said event information including first event information defining one or more first required communication periods corresponding to said first MAC and second event information defining one or more second required communication periods corresponding to said second MAC, and wherein the one or more required communication periods include at least one period selected from the group consisting of a presence period, during which a MAC of said one or more MACs is required to be present on said PHY channel, and an absence period, during which the MAC of said one or more MACs is required to be absent from said PHY channel.

17. The method of claim 12 comprising determining a time distribution map corresponding to said binding, based on event information of said one or more MACs, the time distribution map defining one or more non-overlapping communication periods assigned to said one or more MACs.

18. The method of claim 15 comprising scheduling a session for a particular binding, scheduling communication of the one or more MACs of said particular binding during said session, switching to another session scheduled for an other binding, and switching the one or more MACs of the particular binding to a power-save mode.

19. A wireless communication system comprising:
a wireless communication device including:
wireless communication circuitry to schedule communication of a plurality of Medium-Access-Controllers (MACs) via a Physical layer (PHY) module, the PHY module including a Radio-Frequency physical layer and a Baseband physical layer; and
a host driver to generate binding information defining a plurality of bindings between the plurality of MACs and a plurality of different PHY communication channels sharing said PHY module, wherein a binding of said bindings binds between a PHY channel of said PHY channels and one or more MACs of said plurality of MACs,
the wireless communication circuitry is to schedule communication of said plurality of MACs over said plurality of PHY channels, based on said binding information.

20. The system of claim 19, wherein said wireless communication circuitry is to receive from said host driver event information defining one or more required communication periods corresponding to a MAC of said plurality of MACs, and wherein the wireless communication circuitry is to schedule the communication of said plurality of MACs over said plurality of PHY channels based on said event information.

21. The system of claim 20, wherein at least one particular binding binds at least first and second MACs to a particular PHY channel, said event information including first event information defining one or more first required communication periods corresponding to said first MAC and second event information defining one or more second required communication periods corresponding to said second MAC.

22. The system of claim 21, wherein said binding information includes quota information defining a relative distribution of communication resources between said plurality of bindings, and wherein, based on said quota information, said wireless communication circuitry is to distribute at least one time period, which is not required based on said first and second event information, between said first and second MACs.

23. The system of claim 20, wherein the one or more required communication periods include at least one period selected from the group consisting of a presence period, during which a MAC of said one or more MACs is required to be present on said PHY channel, and an absence period, during which the MAC of said one or more MACs is required to be absent from said PHY channel.

24. The system of claim 20, wherein said one or more required communication periods include at least one period selected from the group consisting of a beacon interval, a delivery traffic indication message (DTIM) interval, a contention time, a scanning period, and an absence period.

25. A product including a non-transitory storage medium having stored thereon instructions that, when executed by a machine, result in:
communicating binding information, the binding information defining a plurality of bindings between a plurality of Medium-Access-Controllers (MACs) and a plurality of different Physical layer (PHY) communication channels sharing a common PHY module, the PHY module including a Radio-Frequency physical layer and a Baseband physical layer, wherein a binding of said bindings binds between a PHY channel of said PHY channels and one or more MACs of said plurality of MACs; and
scheduling transmissions of said plurality of MACs over said plurality of PHY channels, according to a schedule, which is based on said binding information.

26. The product of claim 25, wherein said instructions result in communicating event information defining one or more required communication periods corresponding to a MAC of said plurality of MACs, wherein said schedule is based on said event information.

27. The product of claim 25, wherein said instructions result in scheduling a session for a particular binding, scheduling communication of the one or more MACs of said particular binding during said session, switching to another session scheduled for another binding, and switching the one or more MACs of the particular binding to a power-save mode.

\* \* \* \* \*